US012754534B2

(12) United States Patent
Goossen et al.

(10) Patent No.: US 12,754,534 B2
(45) Date of Patent: Oct. 6, 2026

(54) METHOD AND SYSTEM TO TRAIN AND APPLY A NEURAL NETWORK TO ACHIEVE RAPID ADAPTIVE INITIALIZATION OF SOLVER SOFTWARE

(71) Applicant: Minds.ai Inc., Santa Cruz, CA (US)

(72) Inventors: Gerard Goossen, Amsterdam (NL); Jasper Jacobus Reinier Maria van Heugten, Utrecht (NL); Tijmen Tieleman, Diemen (NL); Jeroen Bedorf, Heerhugowaard (NL)

(73) Assignee: Applied Materials, Inc., Santa Clara, CA (US)

( * ) Notice: Subject to any disclaimer, the term of this patent is extended or adjusted under 35 U.S.C. 154(b) by 348 days.

(21) Appl. No.: 18/227,222

(22) Filed: Jul. 27, 2023

(65) Prior Publication Data

US 2025/0036110 A1 Jan. 30, 2025

(51) Int. Cl.
*G05B 19/418* (2006.01)

(52) U.S. Cl.
CPC .................. *G05B 19/41865* (2013.01); *G05B 2219/2602* (2013.01)

(58) Field of Classification Search
None
See application file for complete search history.

(56) References Cited

U.S. PATENT DOCUMENTS

2022/0374793 A1* 11/2022 Jezewski .................. G06N 5/04

FOREIGN PATENT DOCUMENTS

DE 102021212483 A1 * 6/2022 ............. G06N 3/084

OTHER PUBLICATIONS

Verbraeken et al., "A Survey on Distributed Machine Learning", Mar. 2020, ACM Computing Surveys vol. 53, pp. 1-33 (Year: 2020).*

* cited by examiner

*Primary Examiner* — David Earl Ogg

(57) ABSTRACT

Significant gains in the execution speed of mathematical programming solvers may be made by applying a representation of the solver problem to a neural network and receiving from the neural network estimates of variables that can be used to initialize the solver. The time spent can be reduced by almost two orders of magnitude, allowing for faster turnaround of solutions, using less compute power, and increasing the ability to attack larger and more detailed problems. Graph neural networks can optionally be used effectively in this application. Subsets of solved problems may also be employed to train the neural network to make better estimates. This improved performance is of great value in producing more optimally efficient scheduling at a faster pace, as needed in semiconductor manufacturing scheduling.

20 Claims, 11 Drawing Sheets

600

608

602

| ID 604 | | | |
|---|---|---|---|
| IND.01 | SS.01 | DTS.01 | 606a |
| IND.02 | SS.02 | DTS.02 | 606b |
| IND.03 | SS.03 | DTS.03 | 606c |
| IND.04 | SS.04 | DTS.04 | 606d |
| IND.05 | SS.05 | DTS.05 | 606e |
| IND.06 | SS.06 | DTS.06 | 606f |
| IND.07 | SS.07 | DTS.07 | 606g |
| IND.08 | SS.08 | DTS.08 | 606h |
| IND.09 | SS.09 | DTS.09 | 606i |
| IND.10 | SS.10 | DTS.10 | 606j |
| IND.n | SS.n | DTS.n | 606n |

FIGURE 6

METHOD AND SYSTEM TO TRAIN AND APPLY A NEURAL NETWORK TO ACHIEVE RAPID ADAPTIVE INITIALIZATION OF SOLVER SOFTWARE

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

STATEMENT REGARDING PRIOR DISCLOSURES BY THE INVENTOR OR A JOINT INVENTOR

Not Applicable.

FIELD OF THE INVENTION

The present invention relates to machine learning systems and techniques applied to generate solutions to multivariable problems. The present invention relates to machine learning systems and techniques that apply machine learning techniques to reduce a solution space and thereby reduce the computational time and resources time required to rapidly converge on a solution.

DESCRIPTION OF RELATED ART INCLUDING INFORMATION DISCLOSED UNDER 37 CFR 1.97 AND 1.98

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Machine learning systems and methods, to include neural network applications, are generally quite effective at converging on a solution within a solution space defined by multivariable input data, constraints and objectives. The value of computationally generating solutions in many environments can be reduced dramatically when the real time taken to generate solutions leads to missing a window of opportunity to apply said solutions most effectively. One way to reduce the real time required to converge on a solution is to reduce the solution space of a particular solution generation.

Industrial environments, such as environments for large scale manufacturing (such as semiconductor device fabrication, manufacturing of aircraft, ships, trucks, automobiles, and large industrial machines), energy production environments (such as oil and gas plants, renewable energy environments, and others), energy extraction environments (such as mining, drilling, and the like), construction environments (such as for construction of large buildings), and others, involve highly complex machines, devices and systems and highly complex workflows, in which operators in various industrial settings must account for diverse varieties of constraints, host parameters, metrics, and the like in order to optimize the scheduling, coordination, pre-positioning, inventory, supply chain, design, development, deployment, and operation of complex and unique equipment, diverse materials, and different technologies in order to better optimize manufacturing performance.

The emergence of ubiquitous communication and computational technology has made it possible to near-continuously connect the control and monitoring modules of numerous and differing complex systems found within a same manufacturing facility and/or associated facilities. More complex industrial environments remain difficult to effectively model for use in schedule generation as the complexity of dealing with data from multiple systems makes it much more difficult to produce more optimal scheduling systems that are effective by various industrial sectors. A need exists for improved methods and systems for data collection and facility scheduling in industrial environments, as well as for improved methods and systems for using collected data to provide improved monitoring, control, intelligent diagnosis of problems and intelligent optimization of operations in various heavy industrial environments.

There is therefore a long-felt need to reduce the computational time required to converge on a solution in many areas where the prior art cannot produce solutions sufficiently timely to be generally or consistently most useful. One object of the present invention is to enable reducing the real time required by certain types of mathematical solver software to converge on a solution by inventively reducing the solution space in particular instances.

BRIEF SUMMARY OF THE INVENTION

Towards these and other objects of the method of the present invention (hereinafter, "the invented method") that are made obvious to one of ordinary skill in the art in light of the present disclosure, what is provided is a system (hereinafter, "the invented system") and method (hereinafter, "the invented method") that applies an appropriately trained machine learning software, e.g., a neural network software, to generate a partial solution as derived from certain input data, and then to provide that partial solution in combination with said input data to a mathematical solver software (hereinafter, "the solver"). The partial solution output of the neural network is thus applied by the solver as initial conditions from which the solver converges on a full solution in view of the input data and additionally in view of objectives and constraints as supplied to the solver.

In an optional aspect of the method of the present invention, the machine learning software, e.g., a neural network, is trained on sets of training data comprising pairs of (1.) input data previously input into the solver, and (2.) a resultant solution previously generated by the solver in accordance with said input data, and optionally a plurality of constraints and/or a plurality of objectives, written into the solver prior to producing the resultant solver solution. In another optional aspect of the present invention, the solver solutions of the training data pairs are preferably generated by the solver in view of a same, or substantially the same, plurality of objectives and constraints, i.e., the input data provides the only varying parameters, or the only substantially varying values, by which the solver generates the solutions included within the training data pairs. It is understood that input data itself may include revisions, and/or simply new objectives and/or constraints to be applied by the solver.

The acceptance by the solver of a partial solution as output by the machine learning software, e.g., the neural network software, as initial conditions result in the solver reducing the solution space in which the solver can converge to a new solution derived in part by the same, or substantively the same, input data from which the machine learning software derived a partial solution. In certain yet alternate exemplary preferred embodiments of the present invention, the solver when applying these initial conditions operates under the same, or substantively similar, objectives and conditions that were applied by the solver in the generation of the solver solutions of the training data pairs.

Various additional alternate exemplary preferred embodiments of the invented method are applied in many fields where solver functionality is enabled by provisions of input data, constraints, and optionally objectives to produce full solver solutions to multivariable challenges. A first exemplary plurality of preferred embodiments of the invented system and/or invented method are variously applicable in semiconductor fabrication. A second exemplary plurality of preferred embodiments of the invented system and/or invented method are variously applicable in the production of industrial systems, computational systems, vehicles, and consumer goods. A second exemplary plurality of preferred embodiments of the invented system and/or invented method are variously applicable in (1.) manufacturing of aircraft, ships, trucks, automobiles, and large industrial machines); (2.) energy production environments (such as oil and gas plants, renewable energy environments, and others); (3.) energy extraction environments (such as mining, drilling, and the like); and (4.) construction environments (such as for construction of large buildings), and others environments that involve the application of highly complex machines, devices and systems within moderately or highly complex workflows, in which operators in various industrial settings must account for diverse varieties of constraints, host of parameters, metrics, and the like in order to optimize the scheduling, coordination, pre-positioning, inventory, supply chain, design, development, deployment, and operation of complex and unique equipment, diverse materials, and different technologies.

In certain other alternate exemplary preferred embodiments of the invented method, the solver receives input data from a manufacturing execution system. In certain even alternate exemplary preferred embodiments of the invented method, the solver receives additional input data from an alternate computational system or information technology.

In certain still alternate exemplary preferred embodiments of the invented method, the machine learning software comprises a neural network trained by a plurality of trading data pairs. In even other certain still alternate exemplary preferred embodiments of the invented method, the training process of the machine learning software, e.g., a neural network, is performed by supervised learning.

It is understood that the term work-in-progress ("WIP"), is inventory that has begun the manufacturing process and is no longer included in raw materials inventory, but is not yet a completed product. On a balance sheet, work-in-progress is considered to be an asset because money has been spent towards a completed product. Because the product has not been completed, however, WIP is valued lower than finished products.

In certain yet additional alternate preferred embodiments, the invented method may comprise one or more of the following aspects:

1. training a neural networks logic, e.g., a machine learning system or software, or a graph neural network, with a plurality of previously generated full scheduling solver solutions paired with the unique input data set from which each solver solution was derived by the solver;
2. the automated workflow of a fabrication facility operator triggers a requirement that a new scheduling solution (hereinafter, a "schedule") be generated;
3. a current set of input data, i.e., a breakdown of the to-be-scheduled work-in-process as based on the current state of an instant production facility for the relevant equipment is used to formulate a graph representation of the new and current scheduling problem to be solved;
4. said graph representation is sent to the neural network logic, e.g., a graph neural network, which returns a partial solution to the new scheduling problem;
5. a mathematical programming solver is initialized with that partial solution that reduces the problem search space to be addressed by the solver;
6. the solver arrives at a scheduling solution faster than if the neural network partial solution had not been provided; and
7. said scheduling solution is executed by means of automated systems, automated nodes of networked management systems, and/or an automated and bi-directionally communicatively coupled plurality of fabrication equipment to include (1.) semiconductor fabrication equipment; (2.) automated production lines of industrial systems, computational systems, vehicles, and consumer goods; (3.) automated production lines of manufacturing of aircraft, ships, trucks, automobiles, and large industrial machines); (4.) automated control systems of energy production environments, such as but not limited to oil and gas plants, renewable energy environments, and others); (5.) automated control systems of energy extraction environments, such as but not limited to mining, drilling, and the like); and (6.) automated control systems of construction environments, such as for construction of large buildings; and other suitable automated control systems of environments that involve the application of highly complex machines, devices and systems within moderately or highly complex workflows, in which operators in various industrial settings must account for diverse varieties of constraints, host of parameters, metrics, and the like in order to optimize the scheduling, coordination, pre-positioning, inventory, supply chain, design, development, deployment, and operation of complex and unique equipment, diverse materials, and different technologies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWING(S)

The detailed description of some embodiments of the invention is made below with reference to the accompanying figures, wherein like numerals represent corresponding parts of the figures.

Figure 1:
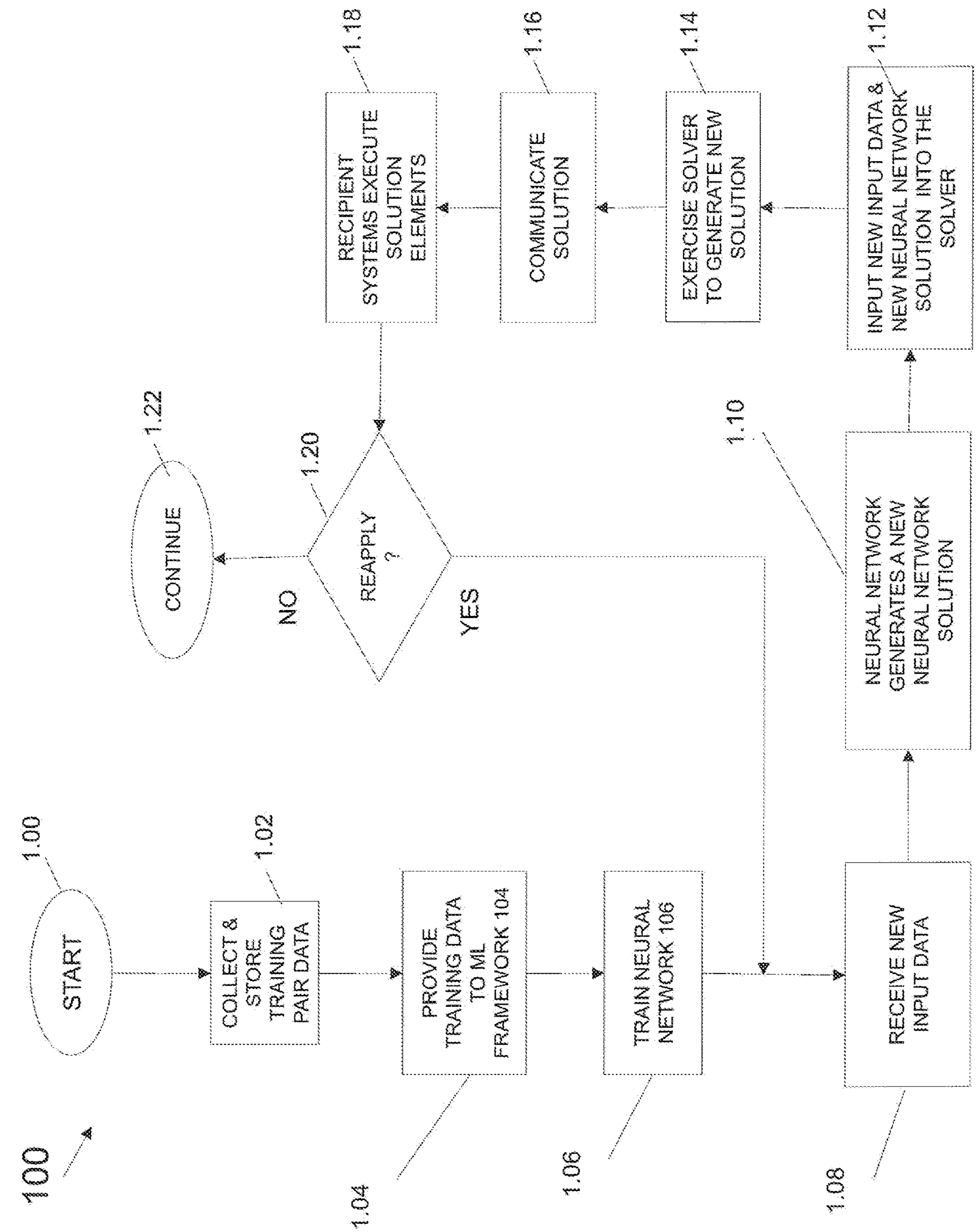
FIG. 1 is a flowchart of a first preferred embodiment of the invented method, wherein a neural network is trained and then receives new input data and the neural network newly generates a neural network's partial solution, whereupon both said partial solution and the new input data is provided to a solver and a new solver solution is generated, communicated, and optionally distributed.
Figure 2:
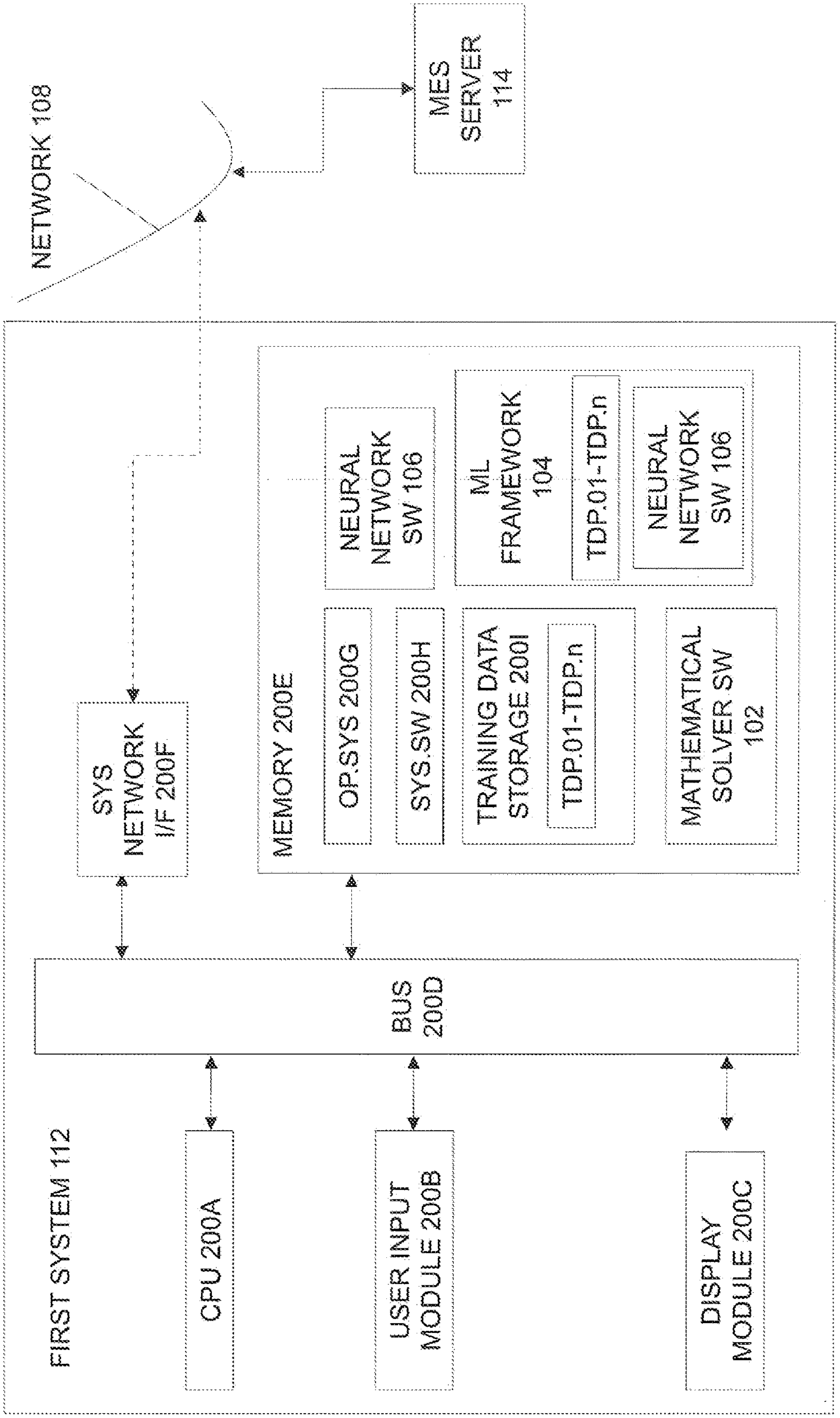
FIG. 2 is a block diagram of a first system of FIG. 1 that is configured and enabled to practice the method of FIG. 1 and various additional, alternative, and optional aspects of the invented method, and presenting both hardware and software aspects thereof.
Figure 3:
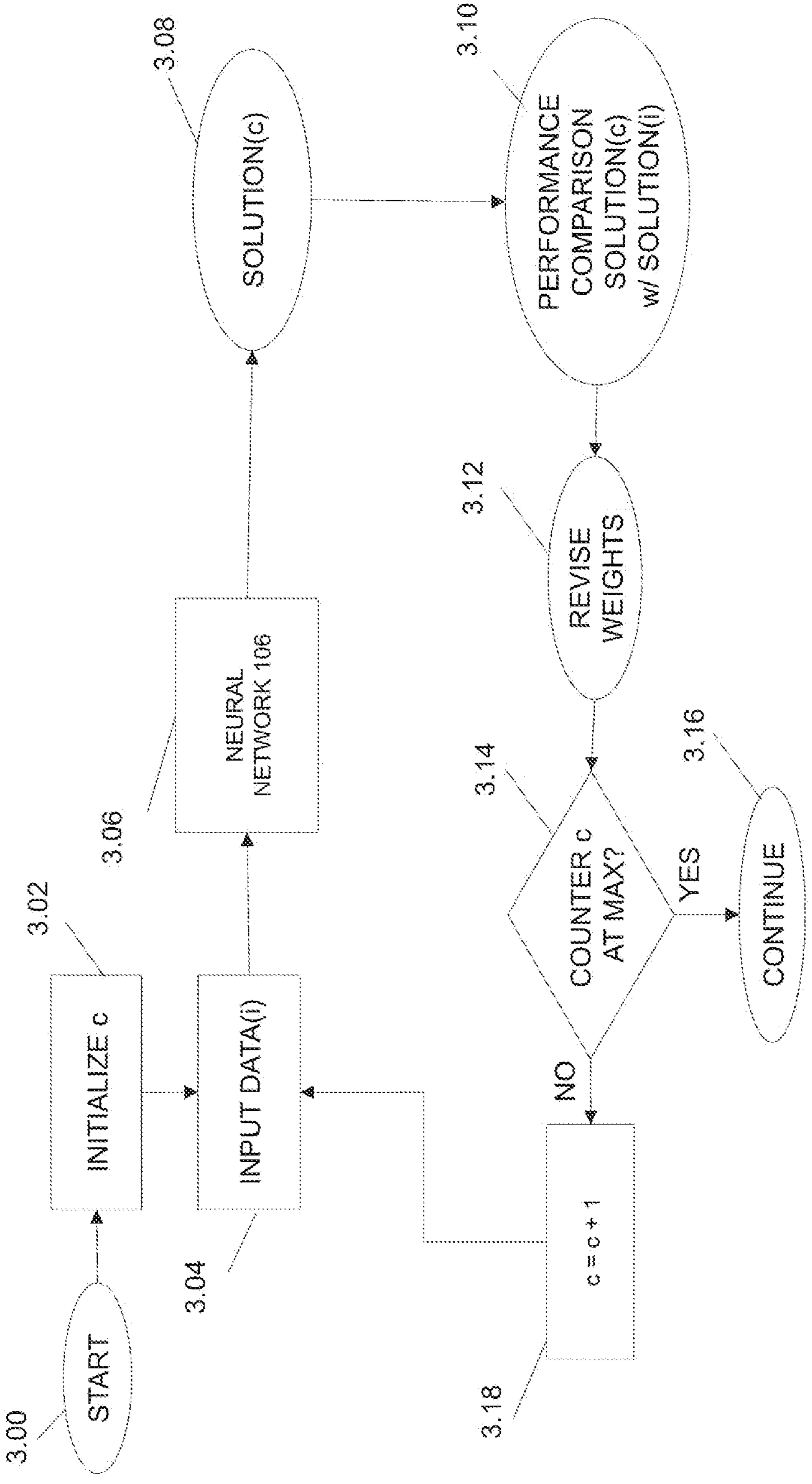
Figure 4:
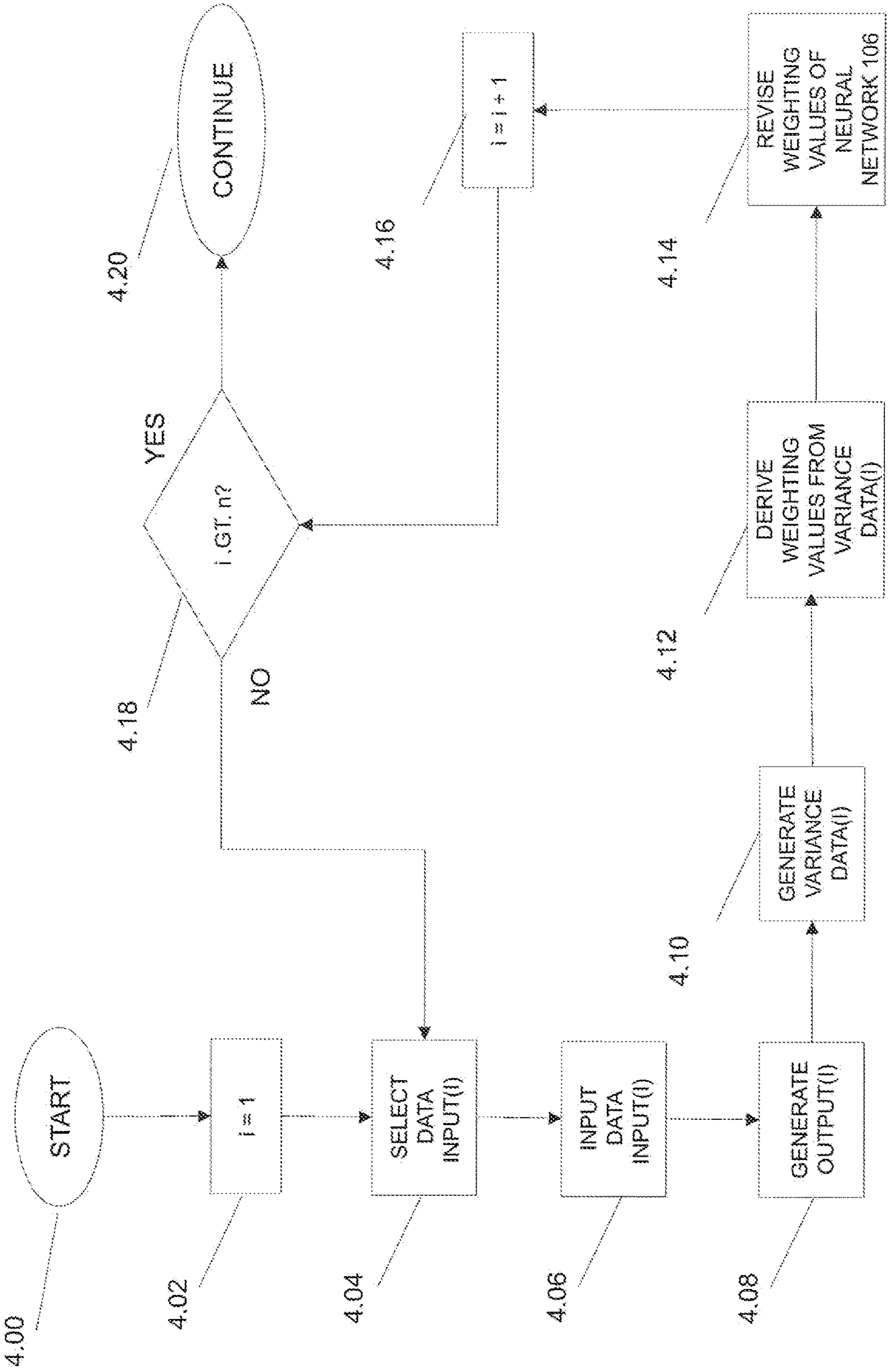
Figure 5:
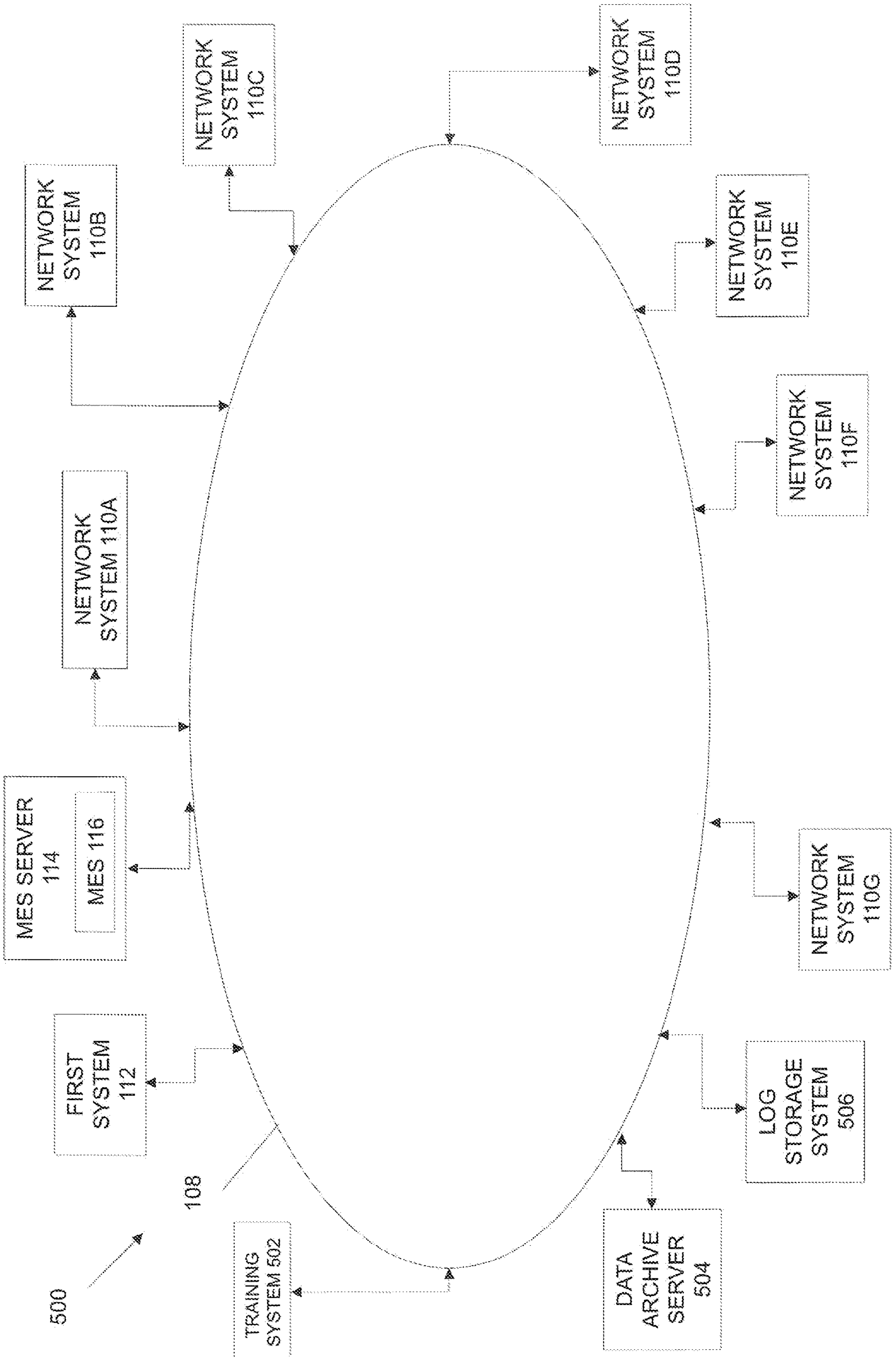
Figure 7A:
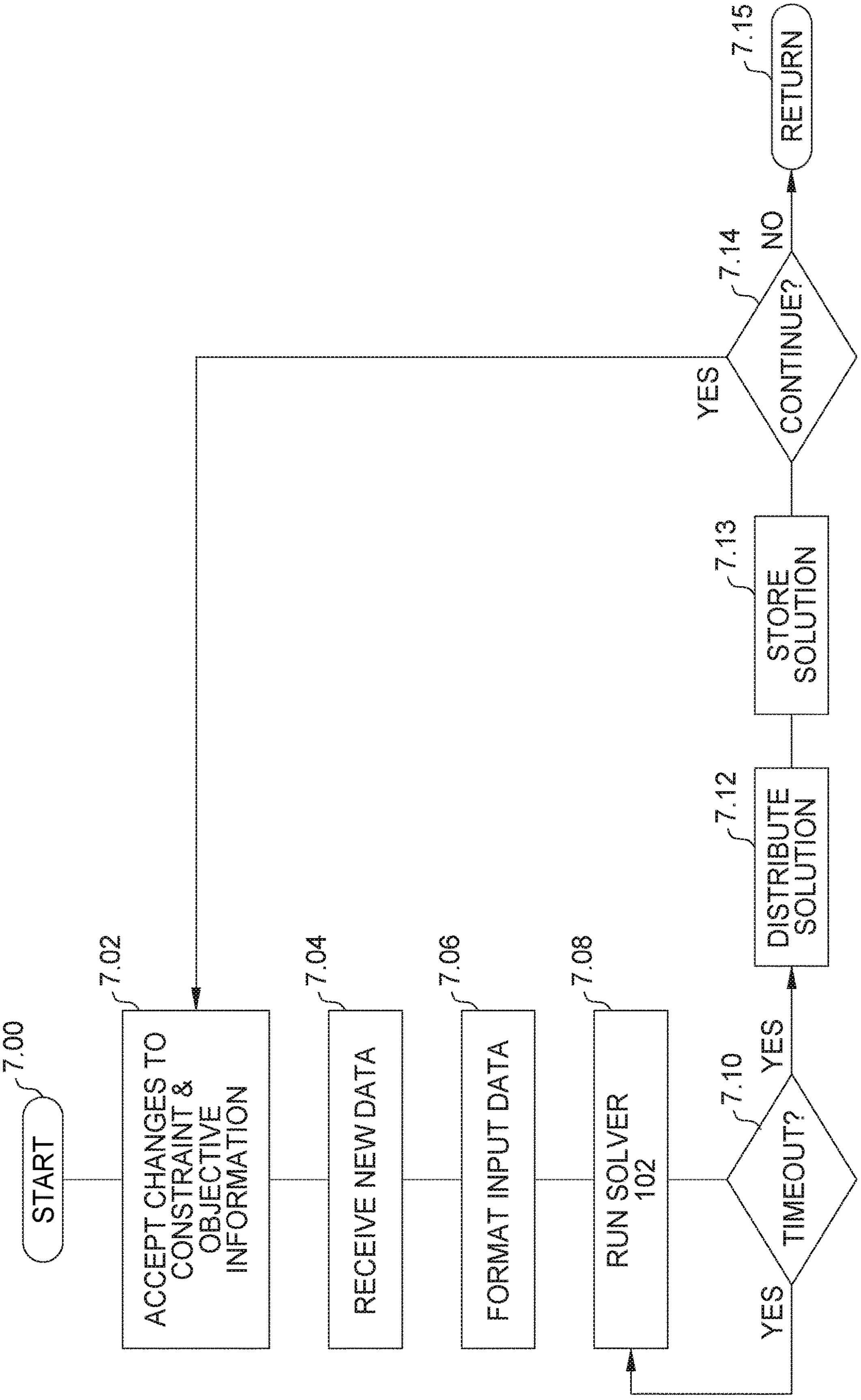
FIG. 7A (PRIOR ART)
Figure 7B:
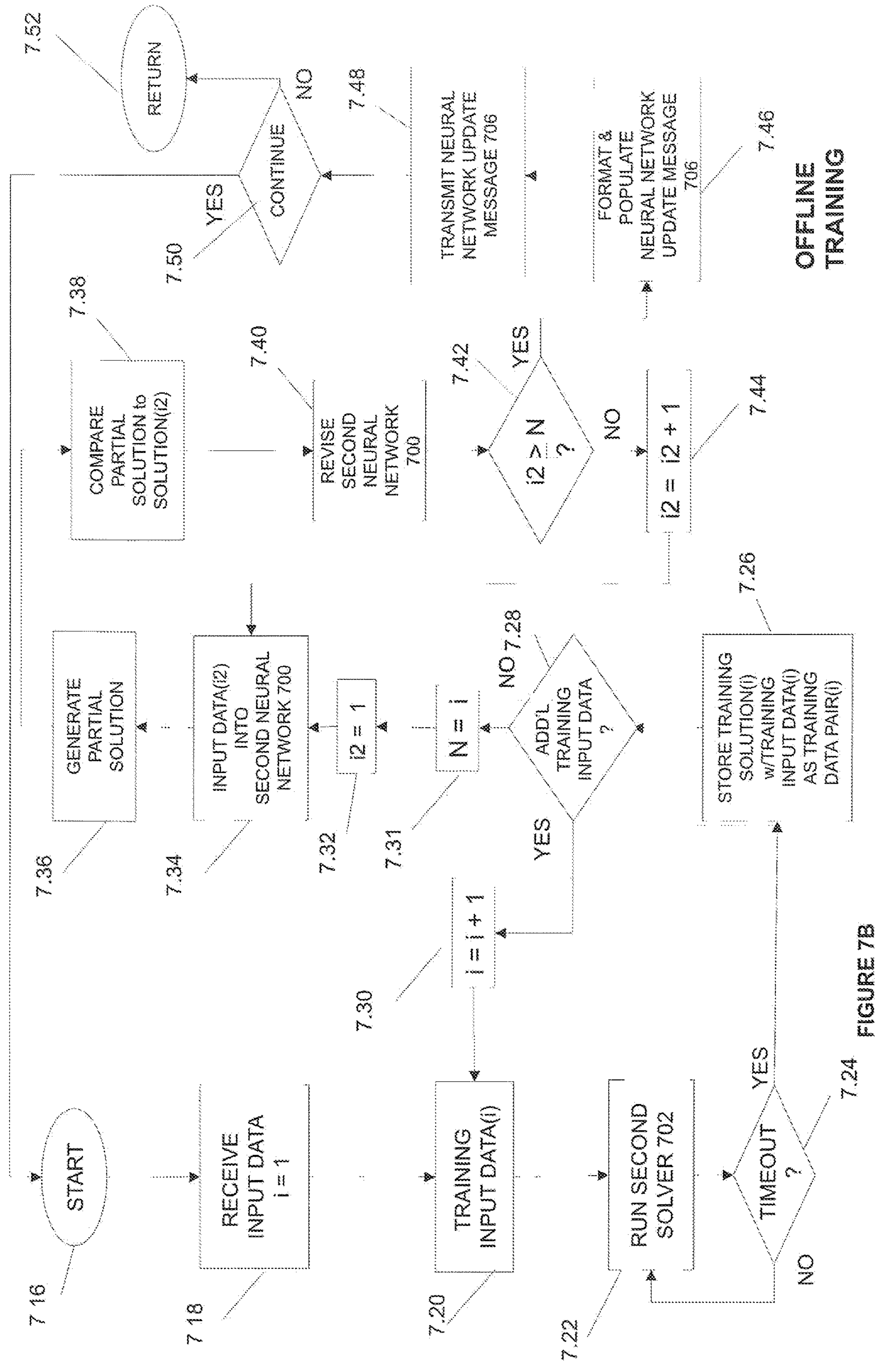
Figure 7C:
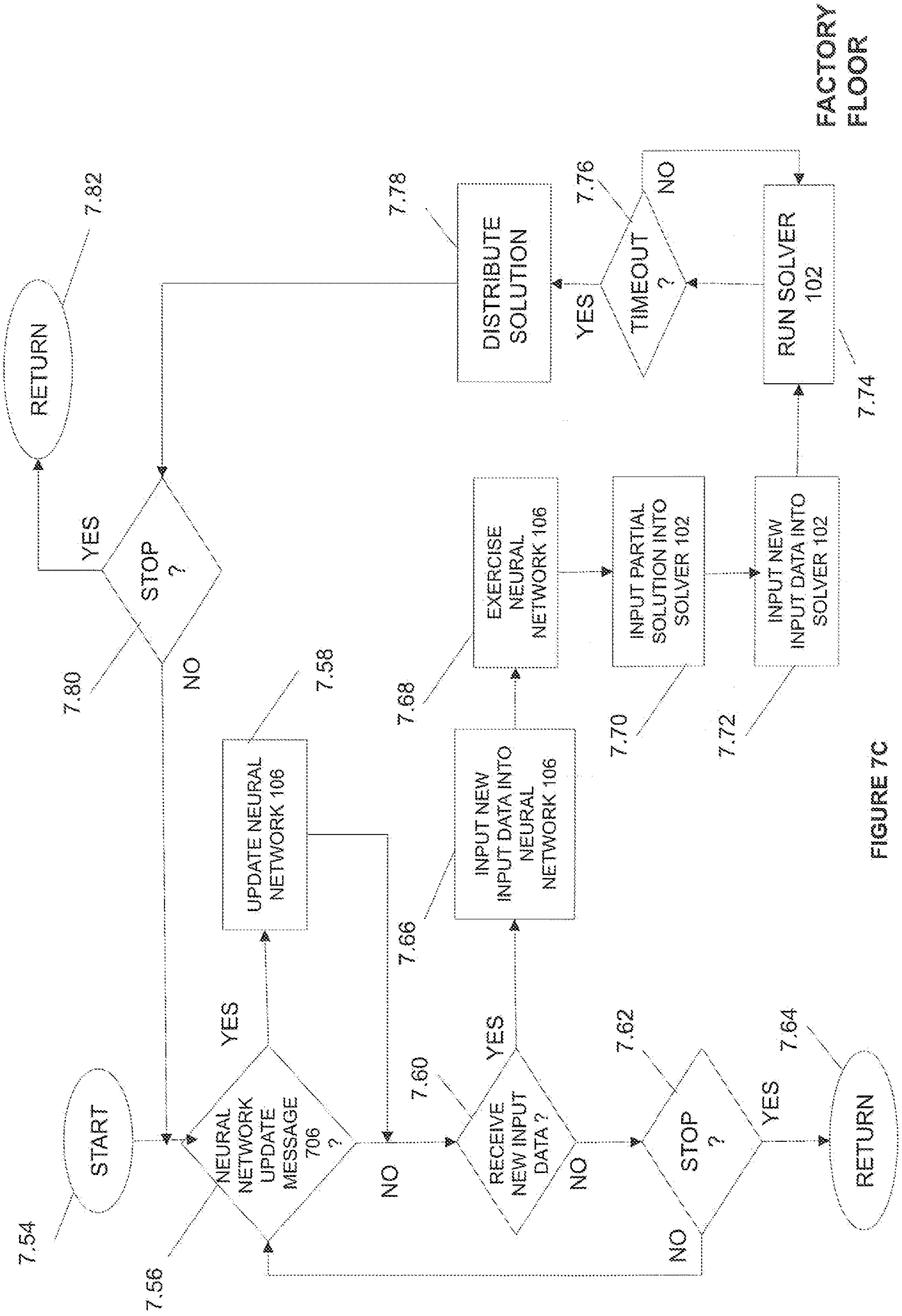
Figure 8:
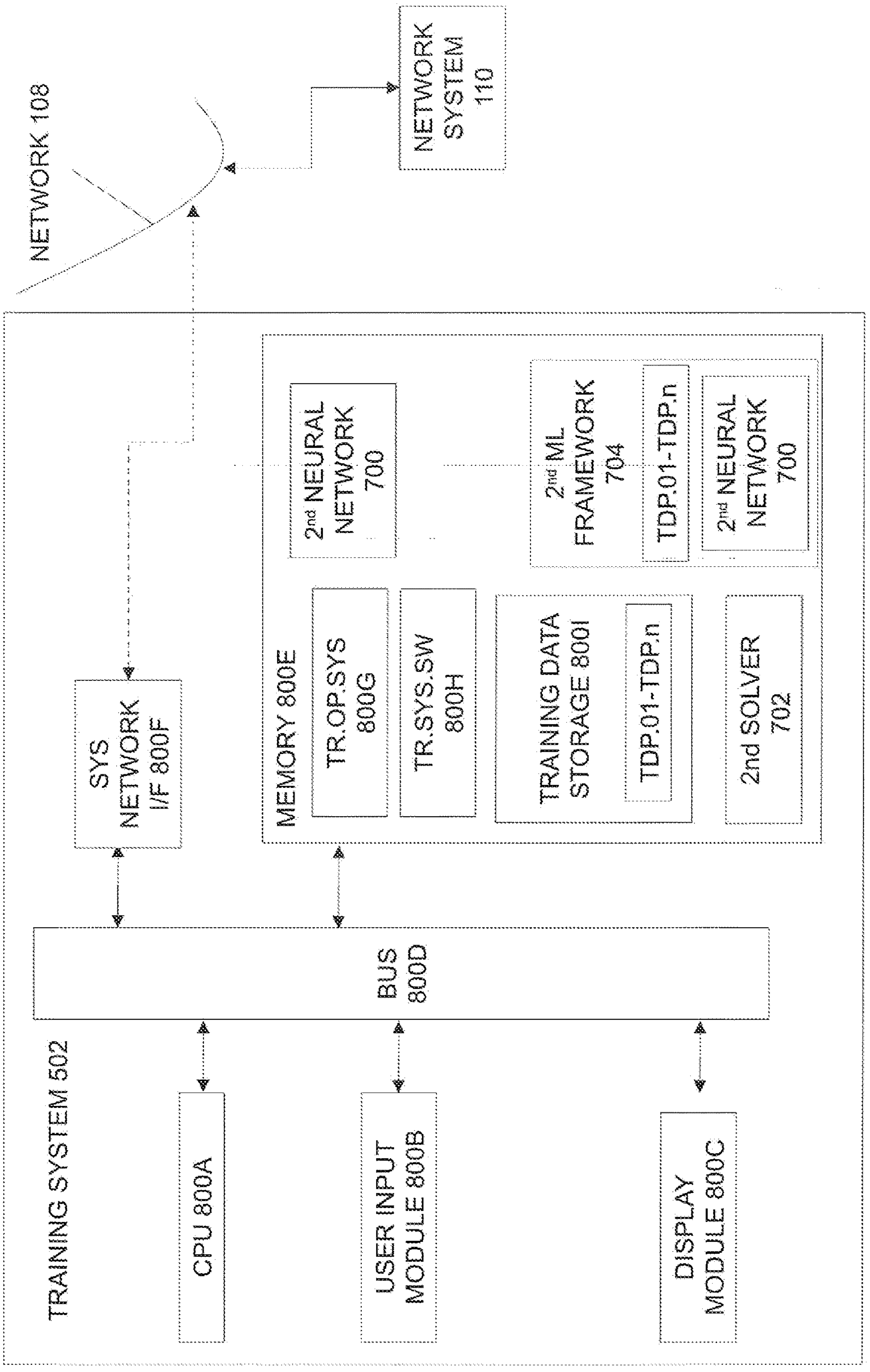
Figure 9:
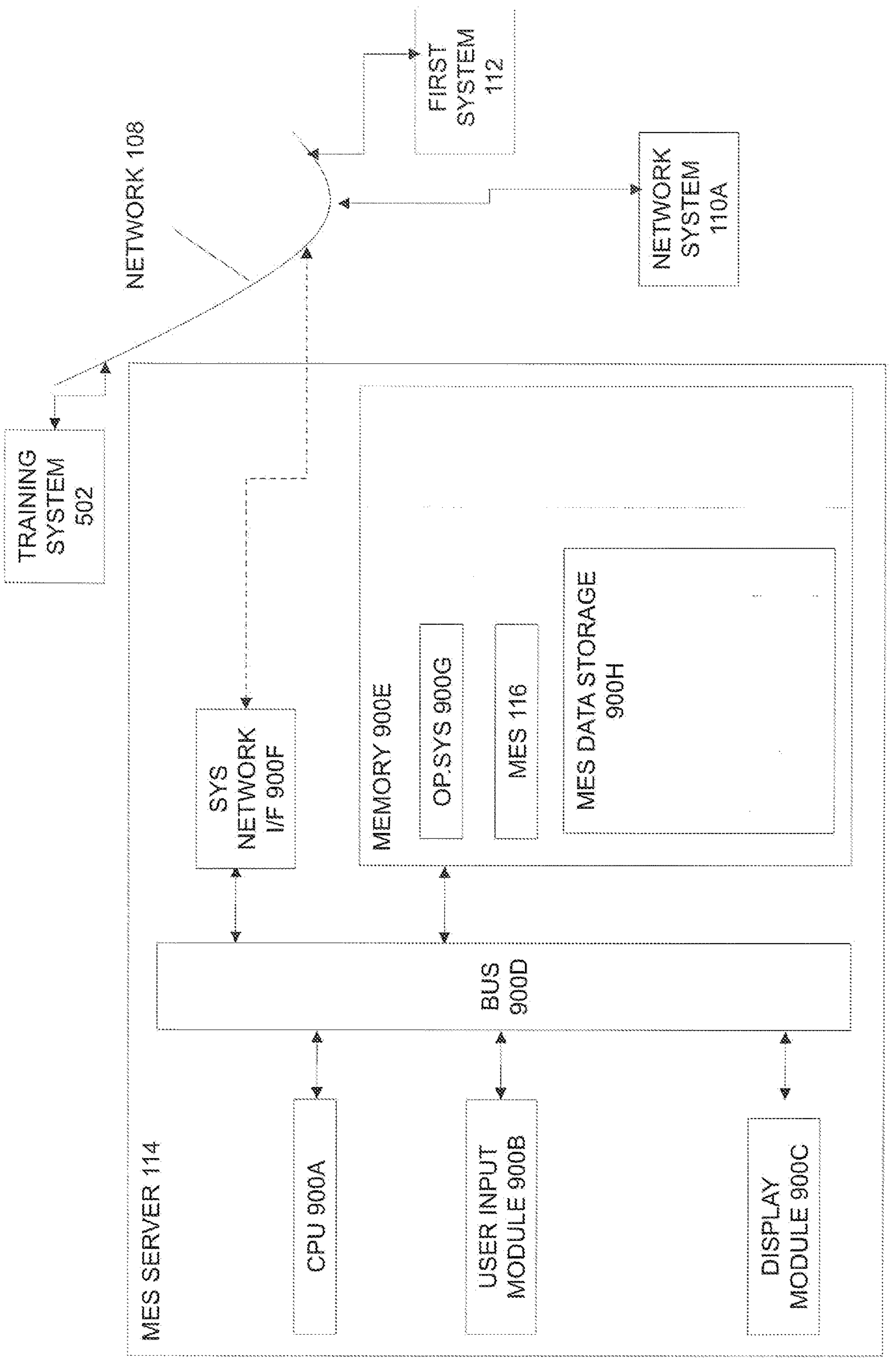

FIG. 3 presents a training of a neural network FIG. 1 and FIG. 2 by a machine learning framework of FIG. 1 and FIG. 2;

FIG. 4 is a flowchart of an alternate preferred embodiment of the method of FIG. 3 as applied by the first system 112 of FIG. 2;

FIG. 5 is a network diagram that includes the communications network, first system, and the network systems of FIG. 2;

FIG. 6 is a representation of training data pairs as stored in the first system of FIG. 1, and/or elsewhere in the elements of FIG. 5;

FIG. 7A is a process chart presenting a prior art method for producing solutions using a mathematical solver of FIG. 1 and FIG. 2;

FIG. 7B is a process chart presenting an invented method for training a neural network utilizing a mathematical solver of FIG. 1 and FIG. 2;

FIG. 7C is a process chart presenting an invented method for utilizing the trained neural net of FIG. 7B to support improved function of a mathematical solver of FIG. 1 and FIG. 2;

FIG. 8 is a block diagram of the neural network training system of FIG. 5 and FIG. 7C; and FIG. 9 is a block diagram of the manufacturing execution server of FIG. 5.

DETAILED DESCRIPTION OF THE INVENTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Referring now to the Figures, and particularly to FIG. 1, FIG. 2, and FIG. 6, FIG. 1 is a flowchart of a first preferred embodiment of the invented method 100 (hereinafter, "the first method" 100). The first method begins at step 1.00 and launches a mathematical solver software 102 (hereinafter, "the solver" 102) with a first plurality of constraints and a first plurality of objectives and proceeds on step 1.02, wherein a plurality of training data pairs TDP.01-TDP.n are collected and stored as depicted in FIG. 2 and FIG. 6. It is understood that each training data pair TDP.01-TDP.n comprises an input data IND.01-IND.n, a solver solution SS.01-SS.n, i.e., solution(1) through solution(i), generated from the training data pair's TDP.01-TDP.n input data IND.01-IND.n by the solver 102 and optionally associated date time stamps DTS.01-DTS.n denoting points in time relevant to the generation of the solver solution of the comprising training data pair TDP.01-TDP.n, as shown in FIG. 6. The training data pair TDP.01-TDP.n of step 1.02 is provided to a machine language framework 104 (hereinafter, "ML framework" 104) for use in training and maintaining a neural network software 106 (hereinafter, "neural network" 106) in step 1.04. The neural network 106 of the ML framework 104 is trained in step 1.06 with said training pair data TDP.01-TDP.n as stored within and/or accessed by the ML framework 104 from or within the first system 112 in step 1.04.

It is understood that the solver solutions SS.01 SS.n are alternately referenced herein as solution(1) through solution (i).

In various still alternate preferred exemplary embodiments of the invented method, the neural network 106 can be, or comprise, a graph neural network, and/or that one or more input data IND.01-IND.n may be embodied as graph data. Graph data encodes the relationship of the variables of a problem. For example, for a simple scheduling problem, a plurality of nodes of a graph defined by graph data may each represent one particular tool, one specific type of operation, an indicator of assignment of an operation to a tool, and/or an indicator of precedence of operation i to operation j.

The edges in the graph may indicate the possible relationships between the nodes, such as the node indicating "assignment of an operation i to tool j" has two edges to a node "operation i" and a node "tool j". The node "precedence of operation i to operation j" has edges to node "operation i" and node "operation j". In certain optional alternate exemplary preferred embodiments of the invented method, the graph can be extended with other information, for example, related to batching, and critical queue time constraints.

In step 1.08 a new data input is delivered to the neural network 106 and the neural network 106 is exercised in step 1.10 to generate a partial solution. It is understood that neural network solutions can typically be generated faster than the solver 102 can generate its own solver solutions from processing input data.

In step 1.12, the most recently generated neural network solution of the most recent execution of step 1.10 is provided to the solver 102 contemporaneously with the new input data from which the neural network 106 generated the most recently generated partial solution in the most recent execution of step 1.10. The solver 102 is then exercised in step 1.14 to produce a new solver solution at least partially on the basis of said new input data and the most recently generated partial solution of the neural network. It is understood that the solver 102 may additionally and/or optionally be generating the new solver solution of step 1.14 in accordance with one or a plurality of constraints and/or one or a plurality of objectives as applied by the solver 102. It is understood that the solver 102 may additionally, alternatively and/or optionally be receiving or deriving one or more constraints and/or objectives from information embedded in the new input data received by the solver 102 in step 1.12.

It is understood that in certain alternate preferred embodiments of the present invention training pair data TDP.01-TDP.n were recorded when the solver 102 was acting in accordance with a same plurality of constraints and a same plurality of objectives.

The solver 102 may optionally communicate the new solver solution by means of an electronic communications network 108 (hereinafter, "the comms network" 108) to one or more network communications enabled systems 110A-110G (hereinafter, "network systems" 110A-110G) in step 1.16. It is understood that one or more network systems 100A-110G may be configured and enabled to automatically receive and execute in step 1.18 relevant data, instructions and/or portions of the new solver solution of step 1.14.

In step 1.20 a determination is made by an authorized and enabled information technology system 112 (hereinafter, "the first system" 112) whether to initiate an additional execution of the solution generating loop of steps 1.06 through 1.18, or to proceed onto to step 1.22 to perform alternate computational and/or communications tasks.

It is understood that the solver 102 may be or comprise a commercially available mathematical programming solver, to include, but not limited to a GUROBI OPTIMIZER™ mathematical programming solver as licensed by Gurobi Optimization, LLC of Houston, Texas, an IBM ILOG CPLEX OPTIMIZER™ mathematical programming solver as licensed by International Business Machines Corporation of Armonk, NY, and/or other suitable mathematical programming solver software. It is understood that the ML framework 104 may be or comprise an open source machine learning software including, but not limited to PYTORCH™ machine learning framework software as deposited at github.com/pytorch/pytorch, a CAFFE machine learning framework software (Convoluted Architecture for Fast Feature Embedding) deep learning framework software originally developed as University of California, Berkely, CA, a TENSORFLOW™ software library for machine learning and artificial intelligence as released by Google, LLC, of Mountain View, CA, and/or other suitable machine learning framework software known in the art.

Referring now generally to the Figures, and particularly to FIG. 2, FIG. 2 is a block diagram of the first system 112 configured for practicing the method of FIG. 1 and FIG. 7C and displaying together both hardware and software aspects thereof, wherein the first system 112 comprises a processor 200A deployed as a central processing unit 200A (hereinafter, "CPU" 200A), wherein the processor 200A may be one or more suitable processors multiprocessors, controllers, fixed logic circuits and/or programmed logic known in the art. Some exemplary processors that processor 200A may be or comprise include one or more commercially available processors known in the art, such as one or more ARM Cortex A9™ central processing units, one or more ARM CORTEX X2™ central processing unit, and/or one or more ARM CORTEX X4™ central processing unit as licensed by ARM of Cambridge, England; one or more INTEL CORE I9™ central processing units as marketed by INTEL CORPORATION of Santa Clara, CA; one or more MALI-G710™ graphics processing units, G510™ graphic processing units, and G310™ graphics processing units as marketed by ARM Corporation of Cambridge, England; one or more intercommunicating graphics processing unit (GPU) modules including, but not limited to, a GEFORCE RTX 3060™ GPU Card manufactured by NVIDIA Corporation of Santa Clara, CA, and and/or other suitable processors and modules comprising one or more processors known in the art in singularity or in combination.

The first system 112 comprises a user input module 200B; a video display module 200C; a communications bus 200D bi-directionally communicatively coupled with the CPU 200A, the user input module 200B, the display module 200C, and a system memory 200E. The software bus 200D is further bi-directionally coupled with a network interface 200F that optionally enables communication with a plurality of network systems 110A-110G by means of the comms network 108. The software bus 200D facilitates communications between the above-mentioned components of the first system 112. The system memory 200E of the first system 112 includes a software operating system OP.SYS 200G.

The first system 112 may be selected from freely available, open source and/or commercially available computational equipment, to include but not limited to a.) a Z8 G4™ computer workstation marketed by Hewlett Packard Enterprise of San Jose, CA and running a Red Hat Linux™ operating system marketed by Red Hat, Inc. of Raleigh, NC as the software operating system OP.SYS 200G; (b.) a Dell Precision™ computer workstation marketed by Dell Corporation of Round Rock, Texas, and running a Windows™ 10 operating system software operating system OP.SYS 200G, as marketed by Microsoft Corporation of Redmond, WA; (d.) a MAC PRO™ workstation running MacOS X™ as the software operating system OP.SYS 200G and as marketed by Apple, Inc. of Cupertino, CA; or (e.) other suitable computational system or electronic communications device known in the art capable of providing networking and operating system services as known in the art.

The exemplary system software program SW 200H comprises machine executable instructions and associated data structures and is optionally adapted to enable the first system 112 to perform, execute and instantiate all elements, aspects and steps as required of the first system 112 to practice the invented method in its various preferred embodiments, including in interaction with other devices of the comms network 108. The system memory 200E may further include training data storage 200I, the solver 102; the neural network 106; and the ML framework 104. It is understood that the ML framework 104 may comprise the neural network 106, and/or that the neural network may be stored with the system memory 200E. It is further understood that the ML framework 104 may additionally comprise and store the plurality of training data pairs TDP.01-TDP.n and/or access the training data pairs TDP.01-TDP.n as stored by the training data storage 200I.

Certain alternate preferred embodiments of the invented method may be executed entirely within the first system 112 and/or as driven by user inputs provided via the user input module 200B and/or input data, information, instructions, constraints and/or objectives as communicated via the user input module 200B and/or the comms network 108, and/or via other input data, information, instructions, constraints and/or objectives communications means and methods known in the art. In certain still additional alternate exemplary preferred embodiments of the invented method, the neural network 106 may be stored within the ML framework 104 and/or in first system memory 200E.

Referring now generally to the Figures, and particularly to FIG. 3, FIG. 3 presents the first system 112 applying the machine learning framework 104 to train the neural network 106. In step 3.00 the first system 112 receives or selects a training input data(i) from a training data pair(i) that includes a related solver solution(i). In step 3.02, a counter c is initialized. At step 3.04, an input data(i) of the training data pair(i) is input into the neural network 106. The neural network 106 is then exercised in step 3.06 to generate a new solution(c) in step 3.08. The new solution(c) of step 3.08 is processed by the ML framework 104 to determine a degree of variance, i.e., a performance comparison, between the new solution(c) of step 3.08 solution(c) of the training data pair(i) accessed in step 3.04. At step 3.10, the solution(c) produced in the most recent execution step 3.08 is compared to the training data solution(i) of the training data pair(i) to assess the performance of the neural network 106. The performance comparison of step 3.10 is applied to revise a plurality of weighting values of the neural network 106 in step 3.12. At step 3.14, the first system 112 determines whether a last round of training has occurred by comparing the counter c to a preset maximum number of training cycles. When the first system 112 determines that a last round of training has not occurred, the first system 112 proceeds onto step 3.18, wherein the counter c is incremented and proceeds on an additional execution of step 3.04. When the first system 112 determines that a last round of training has occurred, the first system 112 proceeds onto step 3.16, wherein the first system 112 moves on to perform other computational and/or communications processes.

In certain other still alternate exemplary preferred embodiments of the invented method, the neural network training cycle of steps 3.04 through 3.18 initiates the counter c to be equal to 1 at each execution of step 3.02 and continues incrementing the counter c in each iteration of the step 3.18 of i.e., in which each training data pair(i) is applied a plurality of times to train the neural network 106.

Referring now generally to the Figures, and particularly to FIG. 3 and FIG. 4, FIG. 4 is a flowchart of an alternate preferred embodiment of the method of FIG. 3 as applied by the first system 112. In step 4.00 the system software 200H directs the first system 112 to initiate the method of FIG. 4. In step 4.02 the first system 112 sets a loop counter i to a null initiation value of one. In step 4.04 the first system 112 selects an input data(i) of the training data pair(i) and in step 4.06 an input data(i) is input into the neural network 106, and the neural network 106 then newly applies the input data(i) to generate a new neural network output (i) in step 4.08. It is understood that the system software 200H optionally accepts or formats the input data IND.01-IND.n as graph data prior to providing the input data IND.01-IND.n to the neural network 106.

The new neural network output (i) is compared to a solution(i) of the training data pair(i) in step 4.10 to generate a variance data(i), and the variance data(i) is applied in step 4.12 to generate a new plurality of weighting value revisions (i) of the neural network 106. The plurality of weighting value revisions (i) are applied in step 4.14 to the neural network 106, whereby a training access step (i) of the training of the neural network 106 is complete.

The system software 200H next increments the counter i in step 4.16 and determines in step 4.18 if the counter i exceeds the maximum value n of the training data pairs (1) through training data pairs (n). When the first system 112 determines that the counter i does not exceed the maximum value n, the first system 112 proceeds on to step 4.04 and to initiate an additional execution of steps 4.04 through 4.18. Alternatively, when the first system 112 determines that the counter i exceeds the maximum value n, the first system 112 continues from step 4.16 on to alternate computational and/or communications tasking in step 4.20.

Referring now generally to the Figures, and particularly to FIG. 5, FIG. 5 illustrates an alternate exemplary preferred embodiment of an information technology network 500 comprising the comms network 108 that bi-directionally communicatively couples the first system 112, a plurality of network systems 110A-110G and at least one manufacturing execution system software server 114, and a training system 502. The manufacturing execution systems software server 114 (hereinafter, "MES server 114") comprises and executes a manufacturing systems software 116 (hereinafter, "MES" 116) that serves as the intermediary between the solver 102 and the plurality of plurality of network systems 110A-110G. The MES 116 may be or comprise a commercially available software product, including but not limited to manufacturing execution software configured and provided by Critical Manufacturing of Moreira da Maia, Portugal, IBM ILOG CPLEX OPTIMIZER™ marketed and as licensed by International Business Machines Corporation of Armonk, NY, and/or other suitable manufacturing execution software known in the art.

The MES 116 as enabled by the MES server 114 and provides MES information to the first system 112. This information is processed by the system software 200H into input data IND.01-IND.n for input into the solver 102 at step 1.08 to generate a new solution, such as an automated manufacturing schedule. It is understood that the MES 116 receives information from one or more of the network systems 100A-110G that the MES 116 processes to update and generate the MES information to be sent to the first system 112 via the comms network 108. Certain network systems 100A-110G send information to the MES 116; certain other automated network systems 100A-110G receive selected information from the first system 112 as actionable instructions and operational data; and certain still additional network systems 100A-110G both send information to the MES 116 and receive actionable instructions and/or operational data from the first system 112 parsed from solutions as generated by the solver 102 from the first system 112.

It is understood that where the method of the present invention is applied and configured to support and direct a semiconductor fabrication facility or facilities, the preferred MES 116 is selected from a customized or specifically authored manufacturing systems software and/or commercially available systems software products, including but not limited to IBM SIVIEW™ as semiconductor fabrication manufacturing execution system marketed and as licensed by International Business Machines Corporation of Armonk, NY, Semiconductor Manufacturing Execution Systems™ as marketed and licensed by Siemens of Plano, TX, and/or other suitable semiconductor manufacturing systems software.

An optional data archive server 504 may store input data IND.01-IND.N from which the input data IND.01-IND.n may be later read via the comms network 108 by the training system 102.

It is understood that the data archive server 504 may comprise one, many, or all of the hardware and/or software elements of the first system 112 and/or the training system 502.

An optional log storage system 506 may optionally receive and store solutions generated by the first system 102 and/or the training system 502.

It is understood that the log storage system 506 and the data archive server 504, may comprise one, many, or all of the hardware and/or software elements of the first system 112 and/or the training system 502 as disclosed herein.

One or more network systems 110A-110G may be or comprise one or more of manufacturing systems known in the art which may generally include equipment for use in the process of semiconductor manufacturing including but not limited to Lithography equipment, Etch equipment, Deposition equipment, Metrology/Inspection equipment, Material Removal/Cleaning equipment, Ion Implantation equipment, Photoresist Processing equipment, Test equipment, and/or Assembly and Packaging equipment, and might more specifically include, as a selection of non-limiting examples, a Triase+ ™ Single Wafer Deposition System Chemical Vapor Deposition (CVD) system as manufactured by Tokyo Electron of Tokyo, Japan (note: www.tel.com/product/triase.html #prod2); a TWINSCAN NXE: 3600D™ Lithography system as manufactured by ASML, having global corporate headquarters in Veldhoven, The Netherlands (note: www.asml.com/en/products/euv-lithography-systems/twinscan-nxe-3600d); an Applied Mirra CMP™ Chemical Mechanical Planarization ("CMP") system as manufactured by Applied Materials of Santa Clara, CA (note: www.appliedmaterials.com/us/en/product-library/mirra-cmp-200 mm.html); an Applied Aera 4 Mask Inspection™ system for metrology and inspection as manufactured by Applied Materials of Santa Clara, CA (note; www.appliedmaterials.com/us/en/product-library/aera4-mask-inspection.html); a Centris® Sym3® Y etching system as manufactured by Applied Materials of Santa Clara, CA (note: www.appliedmaterials-.com/us/en/product-library/centris-sym3-y-etch.html); a VIISta® 900XP ion implantation system as manufactured by Applied Materials of Santa Clara, CA (note: www.applied-materials.com/us/en/product-library/viista-900xp.html): a TestStation testing system as manufactured by Teradyne of North Reading, MA (note: www.teradyne.com/teststation-product-family/); an ALTUS® packaging system as manufactured by Lam Research Corporation of Fremont, CA (note: www.lamresearch.com/product/altus-product-family/); a Conductor Etch System 9000 Series™ etch system as manufactured by Hitachi Hi-Tech Corporation of Tokyo, Japan (note: www.hitachi-hightech.com/global/en/products/semiconductor-manufacturing/dry-etch-systems/conductor/9000.html); an SPTS Sigma® PVD physical vapor deposition system as manufactured by KLA Corporation of Milpitas, CA (note: www.kla.com/products/chip-manufacturing/deposition); and/or another suitable information technology systems, computational systems, and/or manufacturing equipment or systems known in art.

One or more network systems 110A-110G may be or comprise one or more of manufacturing systems known in the art which may generally include equipment for use in the process of semiconductor manufacturing including but not limited to Lithography equipment, Etch equipment, Deposition equipment, Metrology/Inspection equipment, Material Removal/Cleaning equipment, Ion Implantation equipment, Photoresist Processing equipment, Test equipment, and/or Assembly and Packaging equipment, and might more specifically include, as a selection of non-limiting examples, a Triase+ ™ Single Wafer Deposition System Chemical Vapor Deposition (CVD) system as manufactured by Tokyo Electron of Tokyo, Japan (note: www.tel.com/product/triase.html #prod2); a TWINSCAN NXE: 3600D™ Lithography system as manufactured by ASML, having global corporate headquarters in Veldhoven, The Netherlands (note: www.asml.com/en/products/euv-lithography-systems/twinscan-nxe-3600d); an Applied Mirra CMP™ Chemical Mechanical Planarization ("CMP") system as manufactured by Applied Materials of Santa Clara, CA (note: www.appliedmaterials.com/us/en/product-library/mirra-cmp-200 mm.html); an Applied Aera 4 Mask Inspection™ system for metrology and inspection as manufactured by Applied Materials of Santa Clara, CA (note; www.appliedmaterials.com/us/en/product-library/aera4-mask-inspection.html); a Centris® Sym3® Y etching system as manufactured by Applied Materials of Santa Clara, CA (note: www.appliedmaterials-.com/us/en/product-library/centris-sym3-y-etch.html); a VIISta® 900XP ion implantation system as manufactured by Applied Materials of Santa Clara, CA (note: www.applied-materials.com/us/en/product-library/viista-900xp.html): a TestStation testing system as manufactured by Teradyne of North Reading, MA (note: www.teradyne.com/teststation-product-family/); an ALTUS® packaging system as manufactured by Lam Research Corporation of Fremont, CA (note: www.lamresearch.com/product/altus-product-family/); a Conductor Etch System 9000 Series™ etch system as manufactured by Hitachi Hi-Tech Corporation of Tokyo, Japan (note: www.hitachi-hightech.com/global/en/products/semiconductor-manufacturing/dry-etch-systems/conductor/9000.html); an SPTS Sigma® PVD physical vapor deposition system as manufactured by KLA Corporation of Milpitas, CA (note: www.kla.com/products/chip-manufacturing/deposition); and/or another suitable information technology systems, computational systems, and/or manufacturing equipment or systems known in art.

Other types of equipment that may comprise or be comprised within one or more network systems 110A-110G include lithography equipment, etch equipment, deposition equipment, metrology/inspection equipment, material removal/cleaning equipment, ion implantation equipment, photoresist processing equipment, test equipment, and assembly and packaging equipment.

It is understood that semiconductor MES 116 typically includes serialization and work-in-process (WIP) tracking—not only at the batch and lot level, but also to wafer and unit level—for full end-to-end track and trace, and that the solver 102 produces solutions that direct and schedule the operations of network systems 110A-110G. One or more network systems 100A-110G comprise or are comprised within a manufacturer's plant floor control equipment, and other suitable computational and automated manufacturing network systems 110A-110G. It is further understood that the scopes of the meaning of the terms "semiconductor fabrication equipment" and "plant floor control equipment" include test equipment.

In certain yet other alternate embodiments of the invented system, one or more network systems 100A-110G comprise or are comprised within various semiconductor fabrication equipment, to include but not limited to wafer batching information equipment, lithography reticle management equipment, product prioritizations information systems, and critical queue time constraint information systems.

In certain yet other alternate embodiments of the invented system, the solver solution comprises a schedule for the operation of semiconductor fabrication equipment and/or integrated interaction of semiconductor fabrication equipment operations, to include but not limited to wafer batching information equipment, lithography reticle management equipment, product prioritizations information systems, and critical queue time constraint information systems.

Referring now generally to the Figures, and particularly to FIG. 6, FIG. 6 is a block diagram presenting a first preferred exemplary organizational data structure 600 (hereinafter, "the data structure" 600) of the training data pairs TDP.01-TDP.n as stored in the training data storage 200I of the first system 112. The data structure 600 is presented as a table having an identifier row 602 containing and a data structure identifier ID 604 and a plurality of data rows 606*a*-606*n*, wherein each data row 606-606*n* contains a single training data pair TDP.01-TDP.n, and each training data pair TDP.01-TDP.n includes an input data IND.01-IND.n and a paired solver solution SS.01-SS.n. The solver solution SS.01-SS.n of each training data pair TDP.01-TDP.n was generated by the solver 102 processing the input data IND.01-IND.n of the same training data pair TDP.01-TDP.n. An optional additional column 608 contains a plurality of date time stamps TDS1-TDSn, wherein each date time stamps TDS1-TDS represents a recordation of a date and time associated with the date and time of the recordation of the training data pair TDP.01-TDP.n of a same data row 606*a*-606*n*.

Referring now generally to the Figures and particularly to FIG. 7A, FIG. 7A is a process chart presenting a prior art method for producing solutions using the solver 102. At step 7.00, the first system 112 boots up and in step 7.02 optionally receives updated objective and/or constraint information to be written into the solver 102. At step 7.04, the first system 112 receives data from the MES server 114 and formats said data as input data in step 7.06. In step 7.08, the first system 112 inputs the formatted input data of step 7.06 into the solver 102, and optionally writes any updated objective and/or constraint information received in step 7.02 into the solver 102.

In step 7.08, the solver is run until a time out condition, i.e., preset time period, has been spent in deriving a solution, is detected in step 7.10. In step 7.12, the first system 112 distributes the solution generated at the completion of the loop of step 7.08 and in step 7.10 via the comms network 108 to at least one network system, and typically a plurality of network systems 110A-110G. The first system 112 optionally stores training data in one or more log storage systems 506 in step 7.13.

The first system 112 determines in step 7.14 whether to continue on to an additional execution of the loop of steps 7.02 through 7.14. When the first system 112 determines in step 7.14 to continue on to an additional execution of the loop of steps 7.02 through 7.14, the first system 112 proceeds on to execute step 7.02. In the alternative, when the first system 112 determines in step 7.14 to not continue on to an immediate, additional execution of the loop of steps 7.02 through 7.14, the first system 112 proceeds on to execute step 7.15 and perform alternative, optional and/or additional computational and/or communications processing steps.

Referring now generally to the Figures and particularly to FIG. 7B, FIG. 7B is a flowchart of the operations of certain yet other preferred embodiments of the invented method. The training system 502 of FIG. 5 is employed to train a second neural network software 700 (hereinafter, "the second neural network" 700) utilizing a second mathematical software 702 (hereinafter, "the second solver" 702), and a second machine language framework 704 (hereinafter, "second ML framework" 704) of FIG. 8. It is understood that preferably the second solver 702 is an additional copy of the solver 102; and further that the second neural network 702 is preferably an additional copy of the neural network 106; and the second ML framework 704 is preferably an additional copy of the ML framework 104.

At step 7.16, the training system 502 initiates a neural network training cycle. At step 7.18, the training system 502 receives input data IND.01-IND.n as stored in the first system 112, from the MES 116, the MES server 114, one or more data archive servers 504 and/or other suitable prior art training data sources known in the art, via the comms network 108 and sets an index value of i to 1. At step 7.20, training input data(i) is selected from the input data of step 7.18 and is formatted as training input data(i). The training input data(i) is then input into the second solver 702. At step 7.22, the second solver 702 is run with the training input data(i) to produce the training solution(i) possible to calculate within an allotted time period, wherein the allotted time period of step 7.22 and step 7.24 is typically and preferably longer than the time period allowed in an operational environment of FIG. 7A or FIG. 7C rather than a training environment of FIG. 7B. A longer but still finite timeout is imposed in the loop of steps 7.22 and 7.24, as the second solver 702 could run indefinitely. Once the passing of a second timeout is detected at step 7.24, a finalized training solution(i) of step 7.22 is archived at step 7.26 with the training input data(i) as a training data pair(i) for use in training the second neural network 700.

At step 7.28 the training system 502 determines whether to proceed onto an additional execution of the training data generation series of steps 7.20 through 7.28. When the training system 502 determines in step 7.28 to proceed onto an additional execution of the training data generation series of steps 7.18 through 7.28, the training system 502 proceeds onto increment the index i to i plus 1 in step 7.30, and from step 7.30 proceeds onto an additional execution of step 7.20. In the alternative, when the training system 502 determines in step 7.28 not to proceed onto an additional execution of the training data generation series of steps 7.20 through 7.28, the training system 502 proceeds onto step 7.31, and sets value N to be equal to the maximum i value of the most execution of step 7.32, and in step 7.32 initializes a second counter i2 to a value of 1, and therefrom proceeds onto execute step 7.34.

In the neural network training loop of steps 7.34 through 7.44, each training data pair TDP1-TDPi archived in step 7.26 are sequentially applied to train the second neural network 700, wherein the training input data(i2) is input into the second neural network 700 in step 7.34 and the second neural network 700 is exercised to produce a partial solution in step 7.36. The partial solution of step 7.36 is then compared by the second ML framework 704 with the training data solution(i2) in step 7.38, and the second ML framework 704 revises the second neural network 700 in step 7.40. The training system 502 then determines in step 7.42 if the second counter(i2) is equal to or greater than the value of current maximum index value of N, the training system 502 proceeds on to increment the second counter i2 in step 7.44 to i2 plus 1 in step 7.44 and proceeds to perform an additional execution of the steps 7.34 through 7.42.

In the alternative, when the training system 502 then determines in step 7.42 that the counter i2 is equal to or greater than the value of current maximum index value of N the training system 502 proceeds from step 7.42 onto execute step 7.46 and formats and populates a neural network update message 706, and transmits the neural network update message 706 via the comms network 108 in step 7.48.

It is noted that the process chart of FIG. 3 provides a method for training the second neural network 700 by iterating a preset number of repeated applications of the same item of the training input data(i2) to prompt generation of a plurality of increasingly refined solutions for that same item of training input data(i2) by the second neural network 700. The training process of FIG. 7B steps 7.34 through 7.44 may further incorporate the method presented in FIG. 3 as an alternative to steps 7.36 through 7.40 which repeats these steps a plurality of iterations using a same value for i2. Additionally, alternatively and/or optionally, one or more of the aspects or elements of the method of FIG. 3 may be incorporated into one or more executions of the steps of 7.34, 7.36, 7.38 and 7.40.

The training system 502 determines in step 7.50 whether to return to step 7.16 or to proceed onto performing alternate computational and/or communications processes in step 7.52.

Referring now generally to the Figures and particularly to FIG. 7C, FIG. 7C is a flowchart of a plurality of aspects of a second alternate preferred exemplary method of the present invention (hereinafter, "the second method") as implemented by the first system 112. The first system 112 boots up in step 7.54 and then determines whether a new neural network message 706 has been received from the training system 502 in step 7.56. When the first system 112 determines that a new neural network message has been received from the training system 502 in step 7.56, the first system 112 proceeds onto step 7.58 and updates the neural network 106 with the information received from the training system 502 as found in the most recently received neural network message 706. The first system proceeds from either step 7.56 or step 7.58 to step 7.60, and then determines whether a new input data has been received via the comms network 108, and optionally from the MES 114 in part or in whole.

When the first system 112 determines in step 7.60 that a new input data has not been received, the first system proceeds onto step 7.62 and determines whether to return to an additional execution of step 7.56. When the first system 112 determines in step 7.62 to not to return to an additional execution of step 7.56, the first system proceeds onto step 7.64 and to perform alternate computational and/or communications processing.

When the first system 112 determines in step 7.60 that a new input data has been received via the comms network 108, the first system 112 inputs the new input data into the neural network 106 in step 7.66. The first system 112 then exercises the neural network 106 in step 7.68 to produce a new partial solution. In step 7.70 the partial solution of step 7.68 is input into the solver 102, and in step 7.72 the new input data received in step 7.60 is also input into the solver 102.

The solver 102 is run in step 7.74 and processes as inputs the partial solution of step 7.68 and the new input data received in step 7.60. The loop of step 7.74 and step 7.76 permits the solver 102 to produce a new full solution within a timeout time period; it is understood that the timeout time period of the loop of step 7.74 and step 7.76 is preferably shorter than the timeout time period of step 7.22 and step 7.24 of the training process of FIG. 7B.

In step 7.78 the first system 112 distributes the new full solution via the comms network 108 to one or a plurality of the network systems 110A-110G. The first system 112 proceeds from step 7.78 to step 7.80 to determine whether to return to an additional execution of step 7.56. When the first system 112 determines in step 7.80 to not to return to an additional execution of step 7.56, the first system proceeds onto step 7.82 and to perform alternate computational and/or communications processing.

Referring now generally to the Figures, and particularly to FIG. 5 and FIG. 8, FIG. 8 is a block diagram of the training system 502 configured for practicing the method of FIG. 1 and displaying together both hardware and software aspects thereof, wherein the training system 502 comprises a training processor 800A deployed as a central processing unit 800A (hereinafter, "training CPU" 800A), wherein the training processor 800A may be one or more suitable processors, multiprocessors, controllers, fixed logic circuits and/or programmed logic known in the art. Some exemplary processors that the training processor 800A may be or comprise include one or more commercially available processors known in the art, such as one or more ARM Cortex A9™ central processing units, one or more ARM CORTEX X2™ central processing unit, and/or one or more ARM CORTEX X4™ central processing unit as licensed by ARM of Cambridge, England; one or more INTEL CORE I9™ central processing units as marketed by INTEL CORPORATION of Santa Clara, CA; one or more MALI-G710™ graphics processing units, G510™ graphic processing units, and G310™ graphics processing units as marketed by ARM Corporation of Cambridge, England; one or more intercommunicating graphics processing unit (GPU) modules including, but not limited to, a GEFORCE RTX 3060™ GPU Card manufactured by NVIDIA Corporation of Santa Clara, CA, and and/or other suitable processors and modules comprising one or more processors known in the art in singularity or in combination.

The training system 502 further comprises a training user input module 800B; a training video display module 800C; a training communications bus 800D bi-directionally communicatively coupled with the training CPU 800A, the training user input module 800B, the training display module 800C, and a training system memory 800E. The training software bus 800D is further bi-directionally coupled with a network interface 800F that optionally enables communication with a plurality of network systems 100A-110G and the first system 112 by means of the comms network 108. The training software bus 800D facilitates communications between the above-mentioned components of the training system 502. The training system memory 800E of the training system 502 includes a training software operating system TR.OP.SYS 800G.

The training system 502 may be selected from freely available, open source and/or commercially available computational equipment, to include but not limited to a.) a Z8 G4™ computer workstation marketed by Hewlett Packard Enterprise of San Jose, CA and running a Red Hat Linux™ operating system marketed by Red Hat, Inc. of Raleigh, NC as the training system software operating system TR.OP.SYS 800G; (b.) a Dell Precision™ computer workstation marketed by Dell Corporation of Round Rock, Texas, and running a Windows™ 10 as the training system software operating system TR.OP.SYS 800G, as marketed by Microsoft Corporation of Redmond, WA; (d.) a MAC PRO™ workstation running MacOS X™ as the training system software operating system TR.OP.SYS 800G and as marketed by Apple, Inc. of Cupertino, CA; or (e.) other suitable computational system or electronic communications device known in the art capable of providing networking and operating system services as known in the art, to include the types of equipment specified in the Summary of the Invention.

The exemplary training system software program SW 800H comprises machine executable instructions and associated data structures and is optionally adapted to enable the training system 502 to perform, execute and instantiate all elements, aspects and steps as required of the training system 502 to practice the invented method in its various preferred embodiments, including in interaction with other devices of the comms network 108 and the steps and aspects of the method of FIG. 7B. The training system memory 800E may further include training data storage 800I, the second solver 702; the second neural network 700; and the training ML framework 704. It is understood that the training ML framework 104 may comprise the second neural network 700, and/or that the second neural network 700 may be stored with the system memory 800E. It is further understood that the training ML framework 704 may additionally comprise and store the plurality of training data pairs TDP.01-TDP.n and/or access the training data pairs TDP.01-TDP.n as stored by the training system data storage 800I.

Certain alternate preferred embodiments of the invented method may be executed entirely within the training system 502 and/or as driven by user inputs provided via the training user input module 800B and/or input data, information, instructions, constraints and/or objectives as communicated via the training user input module 800B and/or the comms network 108, and/or via other input data, information, instructions, constraints and/or objectives communications means and methods known in the art.

Referring now generally to the Figures, and particularly to FIG. 5 and FIG. 9, FIG. 9 is a block diagram of the MES server 114 that stores and manages the MES 116 and bi-directionally communicates with the first system 112 and a plurality of the network systems 110A-110G.

FIG. 9 displays together both hardware and software aspects of the MES server, wherein the MES server 114 comprises a MES processor 900A (hereinafter, "MES CPU" 900A), wherein the MES CPU 900A may be one or more suitable processors, multiprocessors, controllers, fixed logic circuits and/or programmed logic known in the art. Some exemplary processors that the MES CPU 900A may be or comprise include one or more commercially available processors known in the art, such as one or more ARM Cortex A9™ central processing units, one or more ARM CORTEX X2™ central processing units, and/or one or more ARM CORTEX X4™ central processing units as licensed by ARM of Cambridge, England; one or more INTEL CORE I9™ central processing units as marketed by INTEL CORPORATION of Santa Clara, CA; one or more MALI-G710™ graphics processing units, G510™ graphic processing units, and G310™ graphics processing units as marketed by ARM Corporation of Cambridge, England; one or more intercommunicating graphics processing unit modules ("GPU Cards including, but not limited to, a GEFORCE RTX 3060™ GPU Card manufactured by NVIDIA Corporation of Santa Clara, CA; and and/or other suitable processors and modules comprising one or more processors known in the art in singularity or in combination.

The MES server 114 comprises an MES user input module 900B; an MES video display module 900C; a MES communications bus 900D bi-directionally communicatively coupled with the MES CPU 900A, the MES user input module 900B, the MES display module 900C, and an MES system memory 900E. The MES software bus 900D is further bi-directionally coupled with an MES network interface 900F that optionally enables bidirectional communication with the first system 112, the training system 502, and the plurality of network systems 100A-110G by means of the comms network 108. The MES software bus 900D facilitates communications between the above-mentioned components of the MES server 114. The MES memory 900E of the MES server 114 stores the MES 116 and further includes an MES software operating system MES.OP.SYS 900G.

The MES server 114 may be selected from freely available, open source and/or commercially available computational equipment, to include but not limited to a.) a Z8 G4™ computer workstation marketed by Hewlett Packard Enterprise of San Jose, CA and running a Red Hat Linux™ operating system marketed by Red Hat, Inc. of Raleigh, NC as the MES software operating system MES.OP.SYS 900G; (b.) a Dell Precision™ computer workstation marketed by Dell Corporation of Round Rock, Texas, and running a Windows™ 10 operating system marketed by Microsoft Corporation of Redmond, WA, as the MES software operating system MES.OP.SYS 900G; (d.) a MAC PRO™ workstation running MacOS X™ as the MES software operating system MES.OP.SYS 900G and as marketed by Apple, Inc. of Cupertino, CA; or (e.) other suitable computational system or electronic communications device known in the art capable of providing networking and operating system services as known in the art.

The MES 116 comprises machine executable instructions and associated data structures and is optionally adapted to enable the MES server 114 to execute and instantiate the MES 116 to perform, execute and instantiate all elements, aspects and steps as required of the MES server 114 to practice one or all aspects of the invented method in its various preferred embodiments, including in interaction with other devices of the network 108. The MES memory 900E may further include MES data storage 900H includes at least some of the input data as the MES 116 and MES server 114 provides to the first system 112 by the MES server 114 via the comms network.

Certain alternate preferred embodiments of the invented method enable the MES server 114 to be at least partially driven by commands and other inputs provided via the MES user input module 900B and/or input data, information, instructions, constraints and/or objectives as communicated via the MES user input module 900B and/or the comms network 108, and/or via other input data, information, instructions, constraints and/or objectives communications means and methods known in the art.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the range's limits, an excluding of either or both of those included limits is also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.)

Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Additionally, it should be understood that any transaction or interaction described as occurring between multiple computers is not limited to multiple distinct hardware platforms, and could all be happening on the same computer. It is understood in the art that a single hardware platform may host multiple distinct and separate server functions.

Throughout this specification, like reference numbers signify the same elements throughout the description of the figures.

While selected embodiments have been chosen to illustrate the invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A computer-implemented method for rapidly arriving at mathematical programming solver solutions by initializing a mathematical programming solver ("the solver") stored in one or more non-transitory computer-readable storage memories using a neural network stored in one or more of the non-transitory computer-readable storage memories, the method comprising:

a. training a neural network with a plurality of training data pairs, wherein each training data pair includes an input data processed by the solver to generate a solution of the same training data pair;
b. inputting a new input data into the neural network;
c. exercising the neural network to generate a partial solution;
d. applying the new input data and the partial solution to the solver, where the solution space of the solver is reduced; and
e. exercising the solver to generate a new solution, wherein the solver generates the new solution more rapidly than the solver would have generated a solution without the reduction of the solution space of the solver, whereby operations of the automated semiconductor fabrication equipment are executed as derived at least partially from the at least a portion of the new solution.

2. The method of claim 1, wherein the neural network is a graph neural network.

3. The method of claim 1, wherein the plurality of training data pairs are generated by the solver in accordance with a same plurality of constraints.

4. The method of claim 1, wherein the plurality of training data pairs are generated by the solver in accordance with a same plurality of objectives.

5. The method of claim 4, wherein the plurality of training data pairs are generated by the solver in accordance with a same plurality of constraints.

6. The method of claim 1, wherein the new input data includes a constraint revision that is applied by the solver.

7. The method of claim 1, wherein the new input data includes an objective revision that is applied by the solver.

8. The method of claim 1, wherein the training data comprises information output by a manufacturing execution system.

9. The method of claim 8, wherein the manufacturing execution system is configured to collect data output by at least one automated semiconductor fabrication system.

10. The method of claim 8, wherein the solution comprises scheduling information for at least one automated semiconductor fabrication system.

11. The method of claim 8, wherein the manufacturing execution system receives information from a group of equipment consisting of wafer batching information equipment, and lithography reticle management equipment.

12. The method of claim 8, wherein the manufacturing execution system receives information from a group of information technology systems consisting of wafer batching product prioritizations information systems and critical queue time constraint information systems.

13. The method of claim 1, wherein the solver generates solutions in accordance with constraints selected from group of constraints consisting of wafer batching product prioritizations and critical queue time.

14. The method of claim 1, wherein at least one input data of the plurality of training data pairs is a graph data.

15. The method of claim 12, wherein at least one input data of the plurality of training data pairs are input into the solver as graph data.

16. A computing system comprising one or more intercommunicating processors coupled to one or more non-transitory computer-readable storage memories (hereinafter, “the memories”), at least one of the memories storing program instructions executable by one or more of the processors to implement:

a. training a neural network stored in the memories with a plurality of training data pairs wherein each training data pair includes an input data processed by a solver stored in the memories to generate a solution of the same training data pair;

b. inputting a new input data into the neural network;

c. exercising the neural network to generate a partial solution;

d. applying the new input data and the partial solution to the solver, where the solution space of the solver is reduced; and e. exercising the solver to generate a new solution, wherein the solver generates the new solution more rapidly than the solver would have generated a solution without the reduction of the solution space of the solver.

17. The computer system of claim 16, wherein the new input data is input into the neural network as graph data.

18. The computer system of claim 16, wherein at least a portion of the new input data is received from a manufacturing execution system.

19. The computer system of claim 16, wherein a portion of the solver solution is communicated via an electronic communications network to an automated manufacturing system.

20. The computer system of claim 16, wherein at least a portion of the solver solution is communicated via an electronic communications network to an automated semiconductor fabrication equipment, whereby operations of the automated semiconductor fabrication equipment are executed as derived at least partially from the at least a portion of the new solution.

* * * * *